United States Patent
Morimitsu et al.

(10) Patent No.: US 10,062,880 B2
(45) Date of Patent: Aug. 28, 2018

(54) ASSEMBLED BATTERY AND MANUFACTURING METHOD OF ASSEMBLED BATTERY

(71) Applicant: TOYOTA JIDOSHA KABUSHIKI KAISHA, Toyota-shi, Aichi-ken (JP)

(72) Inventors: Takatoshi Morimitsu, Toyota (JP); Toshinori Okura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 146 days.

(21) Appl. No.: 14/947,541

(22) Filed: Nov. 20, 2015

(65) Prior Publication Data

US 2016/0149175 A1 May 26, 2016

(30) Foreign Application Priority Data

Nov. 25, 2014 (JP) .................. 2014-237508

(51) Int. Cl.
*H01M 2/10* (2006.01)
*H01M 2/14* (2006.01)

(52) U.S. Cl.
CPC ......... *H01M 2/1077* (2013.01); *H01M 2/105* (2013.01); *H01M 2/14* (2013.01)

(58) Field of Classification Search
None
See application file for complete search history.

(56) References Cited

U.S. PATENT DOCUMENTS

| 6,379,837 B1 | 4/2002 | Takahashi et al. |
| 2004/0137323 A1 | 7/2004 | Sato |
| 2010/0015512 A1 | 1/2010 | Inoue et al. |
| 2013/0270749 A1 | 10/2013 | Hachtmann et al. |

FOREIGN PATENT DOCUMENTS

| CN | 103560116 A | 2/2014 |
| JP | 2000-306563 A | 11/2000 |
| JP | 2002-170533 A | 6/2002 |
| JP | 2006-100148 A | 4/2006 |
| JP | 2012248284 A | 12/2012 |
| JP | 2013008655 A | 1/2013 |
| JP | 2013-196810 A | 9/2013 |
| JP | 2013-243123 A | 12/2013 |
| KR | 10-2004-0036579 A | 4/2004 |

*Primary Examiner* — Jonathan Crepeau
(74) *Attorney, Agent, or Firm* — Sughrue Mion, PLLC

(57) ABSTRACT

An assembled battery includes: a holder including a plurality of cell hold portions each having a first surface and a second surface facing an opposite side to the first surface and each having a holding hole, which is a hole penetrating through between the first surface and the second surface, and a connection portion that connects the plurality of cell hold portions to each other; a plurality of cells each having an outside diameter smaller than an inside diameter of the holding hole and inserted into the holding hole of each of the plurality of cell hold portions; and an adhesive provided so as to be solidified in a gap between an outer peripheral surface of a part of the cell which is placed inside the holding hole and an inner peripheral surface of the cell hold portion which constitutes the holding hole.

9 Claims, 15 Drawing Sheets

ASSEMBLED BATTERY AND MANUFACTURING METHOD OF ASSEMBLED BATTERY

INCORPORATION BY REFERENCE

The disclosure of Japanese Patent Application No. 2014-237508 filed on Nov. 25, 2014 including the specification, drawings and abstract is incorporated herein by reference in its entirety.

BACKGROUND OF THE INVENTION

1. Field of the Invention

The present invention relates to an assembled battery and a manufacturing method of an assembled battery.

2. Description of Related Art

There is an assembled battery configured such that a plurality of cells is accommodated in a holder. For example, Japanese Patent Application Publication No. 2013-196810 (JP 2013-196810 A) describes a battery module configured such that a plurality of cylindrical unit cells is accommodated in respective cylindrical holders, and further, upper parts of these holders are fixed by a positive-electrode spacer and lower parts of the holders are fixed by a negative-electrode spacer.

SUMMARY OF THE INVENTION

However, in the battery module described in JP 2013-196810 A, the unit cell is not fixed to the cylindrical holder in which to accommodate the unit cell, and there are variations in dimension (height) among individual unit cells in an axis direction thereof. On this account, when a vibration or an impact is applied to the battery module, the unit cell moves inside the holder in a radial direction and an axis direction (a height direction) of the unit cell, which might cause rattling between the unit cell and the holder and between the unit cell and each of the positive-electrode spacer and the negative-electrode spacer.

The present invention provides an assembled battery in which a cell is fixed to a holder (a holding hole of a cell hold portion), and a manufacturing method of an assembled battery.

A first aspect of the present invention relates to an assembled battery including: a holder including (i) a plurality of cell hold portions each having a first surface and a second surface facing an opposite side to the first surface and each having a holding hole, which is a hole penetrating through between the first surface and the second surface, and (ii) a connection portion that connects the plurality of cell hold portions to each other; a plurality of cells each having an outside diameter smaller than an inside diameter of the holding hole and inserted into the holding hole of each of the plurality of cell hold portions; and an adhesive provided so as to be solidified in a gap between an outer peripheral surface of a part of the cell, the part of the cell being placed inside the holding hole and an inner peripheral surface of the cell hold portion, the inner peripheral surface of the cell hold portion constituting the holding hole.

The above assembled battery includes the adhesive injected and solidified in the gap between the outer peripheral surface of that part of the cell which is placed inside the holding hole and that inner peripheral surface of the cell hold portion which constitutes the holding hole. Hereby, each of the cells is fixed to the holder in a state where the each of the cells is held by each of the cell hold portions via the adhesive (the each of the cells is joined, via the adhesive, to the inner peripheral surface that constitutes the holding hole). Accordingly, in the assembled battery, even if a vibration or an impact is applied to the assembled battery, the cell does not move in a radial direction and an axis direction of the holding hole, which does not cause rattling between the cell and the cell hold portion. Thus, the above assembled battery is an assembled battery in which the cells are more surely fixed to the holder (the holding holes).

Note that the "cell" may be, for example, a single cell having one electrode body in a battery outer case, or a battery having a plurality of electrode bodies in a battery outer case. Further, the "holder" may be, for example, a holder made of a single member having a flat shape and configured such that a plurality of cell hold portions and a connection portion are formed integrally by the single member. In this case, the first surface of the cell hold portion may be a part of the first surface of the holder, and the second surface of the cell hold portion may be a part of the second surface of the holder. Accordingly, in this case, the holding hole may be a hole penetrating through between the first surface and the second surface of the holder. Further, the holder may be a holder configured such that a member constituting the plurality of cell hold portions is integrated with a member constituting the connection portion by joining or the like.

The assembled battery according to the above aspect may be configured such that the cells are fixed to the holder in a state where the cells are held by the cell hold portions via the adhesive.

Further, in the assembled battery according to the above aspect, the cell hold portion may be configured such that an inside diameter of a first open end, which is an open end of the holding hole on a first-surface side, is smaller than an inside diameter of a second open end, which is an open end of the holding hole on a second-surface side, and the inner peripheral surface constituting the holding hole may include a tapered surface having an inside diameter that is decreased toward the first-surface side from the second-surface side.

In the above assembled battery, the cell hold portion is configured such that the inside diameter of the first open end, which is an open end of the holding hole on the first-surface side, is made smaller than the inside diameter of the second open end, which is an open end of the holding hole on the second-surface side. Since the inside diameter (a diameter) of the second open end is larger than the inside diameter (a diameter) of the first open end as such, when the adhesive is injected into the gap from the second-surface side of the cell hold portion in a state where the second surface of the cell hold portion is directed upward (the first surface is directed downward), the adhesive easily comes inside the gap. Further, since the inside diameter of the first open end is smaller than the inside diameter of the second open end, when the adhesive is injected into the gap from the second-surface side of the cell hold portion in a state where the second surface of the cell hold portion is directed upward (the first surface is directed downward), the adhesive thus injected from the second-surface side is hard to drop from the first-surface side.

Besides, that inner peripheral surface of the cell hold portion which constitutes the holding hole includes a tapered surface having an inside diameter that is increased toward the second-surface side from the first-surface side. Because of this, the adhesive thus injected from the second-surface side easily flows toward the first-surface side along the tapered surface, which allows the adhesive to be easily filled into the gap. Hereby, the adhesive can be sufficiently filled into the gap. Accordingly, the assembled battery described above is an assembled battery in which the adhesive is sufficiently filled into the gap, and is an assembled battery in which the cells are fixed to the holder (the holding holes).

Further, the assembled battery according to the above aspect includes a resin sheet provided so as to make contact with the first surfaces of the plurality of cell hold portions, the resin sheet having through holes penetrating through the resin sheet, wherein the through holes of the resin sheet each may have an inside diameter smaller than the inside diameter of the holding hole of the cell hold portion and smaller than the outside diameter of the cell, and that annular hole surrounding portion of the resin sheet which is a part constituting the through hole and is placed around the through hole may be accommodated in the holding hole in a state where the annular hole surrounding portion makes contact with the outer peripheral surface of the cell inserted in the holding hole.

The above assembled battery includes the resin sheet provided so as to make contact with the first surfaces of the plurality of cell hold portions. Further, the annular hole surrounding portion of the resin sheet is accommodated in the holding hole in a state where the annular hole surrounding portion makes contact with the outer peripheral surface of the cell inserted in the holding hole of the cell hold portion. With such a configuration, an opening, on a first-surface side, of the gap between the outer peripheral surface of the cell and the inner peripheral surface constituting the holding hole can be closed by the hole surrounding portion of the resin sheet. Hereby, when the adhesive is injected into the gap from the second-surface side of the cell hold portion in a state where the second surface of the cell hold portion is directed upward (the first surface is directed downward), it is possible to prevent the adhesive thus injected from the second-surface side from leaking from the first-surface side.

Accordingly, the assembled battery described above is an assembled battery in which the adhesive is sufficiently filled into the gap, and is an assembled battery in which the cells are fixed to the holder (the holding holes).

Note that the resin sheet may be, for example, one resin sheet configured such that the same number of through holes as the plurality of holding holes of the plurality of cell hold portions is formed. In this case, if the holder is a holder made of a single member having a flat shape (a plurality of cell hold portions and a connection portion are formed integrally by the single member), the first surface of the cell hold portion is a part of the first surface of the holder, so one resin sheet may be provided on (for example, adhered to) the first surface of the holder. Further, the resin sheet to be used herein may be a resin sheet having one through hole, and the same number of resin sheets as the number of holding holes of the cell hold portions may be used. In this case, each of the plurality of resin sheets may be provided on (for example, adhered to) the first surface of the cell hold portions.

Moreover, in the assembled battery according to the above aspect, that part of the cell holding portion which includes the second open end may be chamfered.

In the above assembled battery, a part including the second open end of the cell hold portion (that end part of the inner peripheral surface constituting the holding hole which is on the second-surface side) is chamfered. In other words, that end part of the inner peripheral surface constituting the holding hole which is on the second-surface side is a chamfered surface. On this account, when the adhesive is injected into the gap from the second-surface side of the cell hold portion in a state where the second surface of the cell hold portion is directed upward (the first surface is directed downward), the adhesive easily comes inside the gap. Hereby, the adhesive can be appropriately filled into the gap.

Accordingly, the assembled battery described above is an assembled battery in which the adhesive is appropriately filled into the gap, and is an assembled battery in which the cells are fixed to the holder (the holding holes). Note that a type of chamfering may be any types of chamfering, such as R-chamfering or C-chamfering.

A second aspect of the present invention relates to a manufacturing method of an assembled battery including a holder including a plurality of cell hold portions each having a first surface and a second surface facing an opposite side to the first surface and each having a holding hole, which is a hole penetrating through between the first surface and the second surface, and a connection portion that connects the plurality of cell hold portions to each other; and a plurality of cells each having an outside diameter smaller than an inside diameter of the holding hole and inserted into the holding hole of each of the plurality of cell hold portions. This method includes a cell insertion step of inserting the cells into the holding holes of the cell hold portions; and an adhesive injection step of injecting an adhesive into a gap between an outer peripheral surface of a part of the cell the part of the cell being placed inside the holding hole and an inner peripheral surface of the cell hold portion, the inner peripheral surface of the cell hold portion constituting the holding hole.

In the above manufacturing method, in the adhesive injection step, the adhesive is injected into the gap between the outer peripheral surface of that part of the cell which is placed inside the holding hole and that inner peripheral surface of the cell hold portion which constitutes the holding hole. Hereby, when the adhesive thus injected is solidified, each of the cells is fixed to the holder in a state where the each of the cells is held by each of the cell hold portions via the adhesive (the each of the cells is joined, via the adhesive, to the inner peripheral surface that constitutes the holding hole). Thus, according to the above manufacturing method, the cells can be fixed to the holder (the holding holes).

On this account, in terms of the assembled battery manufactured by the above manufacturing method, even if a vibration or an impact is applied to the assembled battery, the cell does not move in a radial direction and an axis direction of the holding hole, which does not cause rattling between the cell and the cell hold portion.

Further, in the manufacturing method of the assembled battery, a viscosity of the adhesive to be injected in the adhesive injection step may be within a range of 1 to 500 mPa·s.

In the above manufacturing method, the liquid adhesive having a viscosity of 1 to 500 mPa·s is injected into in the adhesive injection step. By injecting such a low-viscosity adhesive, the adhesive easily comes inside the gap, which allows the adhesive to be filled into the gap, appropriately.

Further, any of the above manufacturing methods of the assembled battery may include a resin sheet setup step of placing, before the cell insertion step, a resin sheet having through holes each having an inside diameter smaller than an inside diameter of the holding hole of the cell hold portion and smaller than an outside diameter of the cell, the resin sheet being placed so as to make contact with the first surfaces of the plurality of cell hold portions, wherein: in the resin sheet setup step, the resin sheet may be placed so that that annular hole surrounding portion of the resin sheet which is a part constituting the through hole and is placed around the through hole is put on the holding hole in an axis direction of the holding hole; in the cell insertion step, the cell may be inserted into the holding holes from a first-surface side of the cell hold portions; and in the adhesive injection step, the adhesive may be injected into the gap from a second-surface side of the cell hold portion in a state where the second surface of the cell hold portion is directed upward.

In the above manufacturing method, in the resin sheet setup step, the resin sheet having through holes each having an inside diameter (a bore diameter) smaller than an inside diameter of the holding hole of the cell hold portion and smaller than an outside diameter of the cell is placed so as to make contact with the first surfaces of the plurality of cell hold portions (e.g., the resin sheet is adhered to the first surfaces). More specifically, the resin sheet is placed so that the annular hole surrounding portion of the resin sheet is put on the holding hole in an axis direction of the holding hole (a direction where the holding hole extends).

After that, in the cell insertion step, the cell is inserted into the holding hole from the first-surface side of the cell holding portion. Hereby, the annular hole surrounding portion of the resin sheet is accommodated in the holding hole in a state where the annular hole surrounding portion makes contact with the outer peripheral surface of the cell inserted in the holding hole. With such a configuration, an opening, on a first-surface side, of the gap between the outer peripheral surface of the cell and the inner peripheral surface constituting the holding hole can be closed by the hole surrounding portion of the resin sheet. Hereby, in the adhesive injection step, when the adhesive is injected into the gap from the second-surface side of the cell hold portion in a state where the second surface of the cell hold portion is directed upward (the first surface is directed downward), it is possible to prevent the adhesive thus injected from the second-surface side from leaking from the first-surface side. This makes it possible to fill the adhesive into the gap, appropriately. More specifically, the adhesive can be filled into the whole gap between the outer peripheral surface of the cell and the inner peripheral surface constituting the holding hole.

Further, in any of the above manufacturing methods of the assembled battery, the cell hold portion may be configured such that an inside diameter of a first open end, which is an open end of the holding hole on a first-surface side, is smaller than an inside diameter of a second open end, which is an open end of the holding hole on a second-surface side, the inner peripheral surface constituting the holding hole may include a tapered surface having an inside diameter that is decreased toward the first-surface side from the second-surface side, and in the adhesive injection step, the adhesive may be injected into the gap from the second-surface side of the cell hold portion in a state where the second surface of the cell hold portion is directed upward.

The above manufacturing method uses a holder in which the cell hold portion is configured such that the inside diameter of the first open end, which is an open end of the holding hole on the first-surface side, is made smaller than the inside diameter of the second open end, which is an open end of the holding hole on the second-surface side. Since the inside diameter (a diameter) of the second open end is made larger than the inside diameter (a diameter) of the first open end as such, when the adhesive is injected into the gap from the second-surface side of the cell hold portion in a state where the second surface of the cell hold portion is directed upward (the first surface is directed downward) in the adhesive injection step, the adhesive easily comes inside the gap. Further, since the inside diameter of the first open end is smaller than the inside diameter of the second open end, when the adhesive is injected from the second-surface side of the cell hold portion in the adhesive injection step, the adhesive thus injected from the second-surface side is hard to drop from the first-surface side.

Besides, that inner peripheral surface of the cell hold portion which constitutes the holding hole includes the tapered surface having an inside diameter that is increased toward the second-surface side from the first-surface side. Because of this, the adhesive injected from the second-surface side easily flows toward the first-surface side along the tapered surface, which allows the adhesive to be easily filled into the gap. Hereby, the adhesive can be sufficiently filled into the gap.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiment 1

Figure 1:
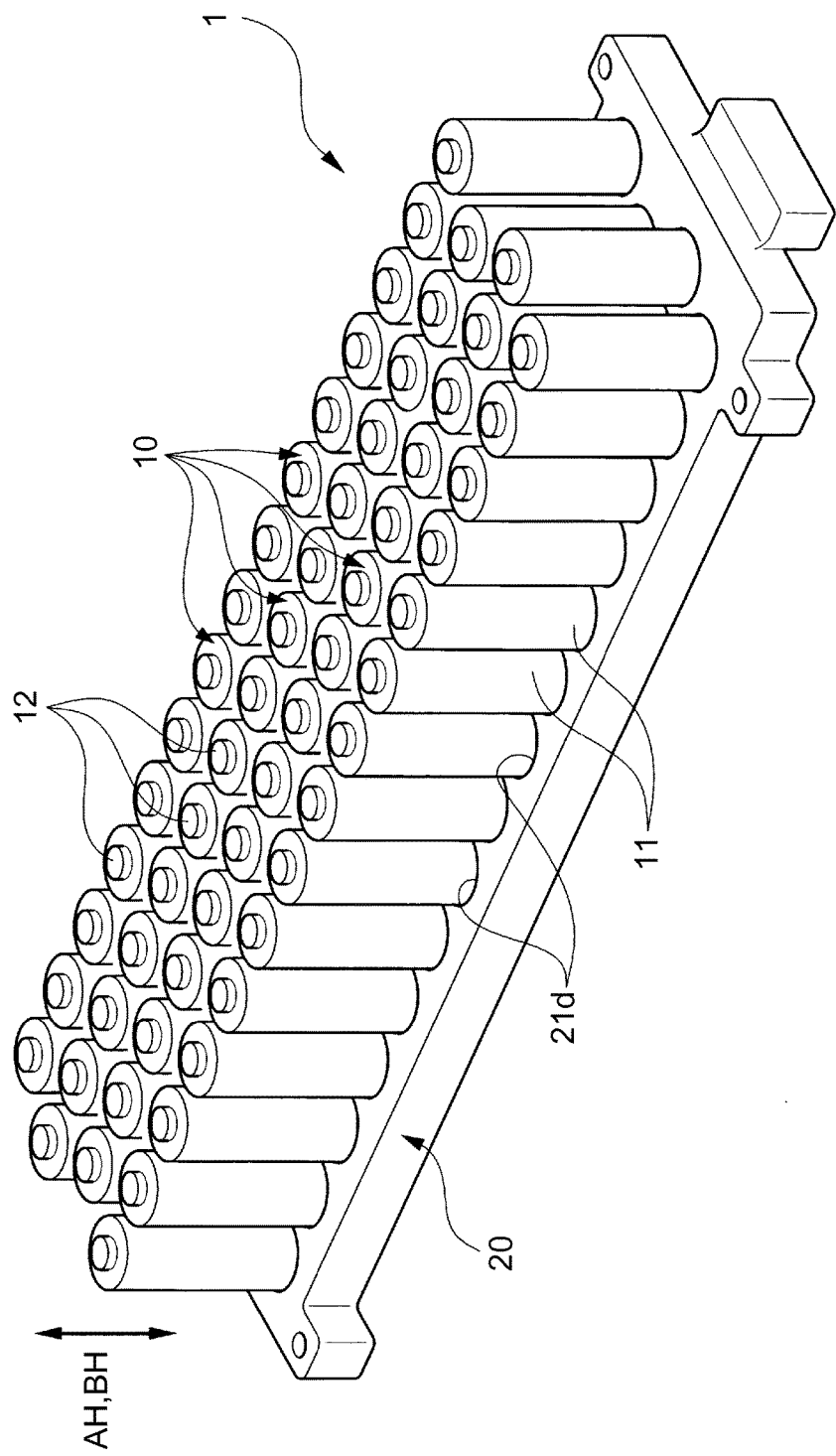
FIG. 1 is a perspective view of an assembled battery according to Embodiment 1.
Figure 2:
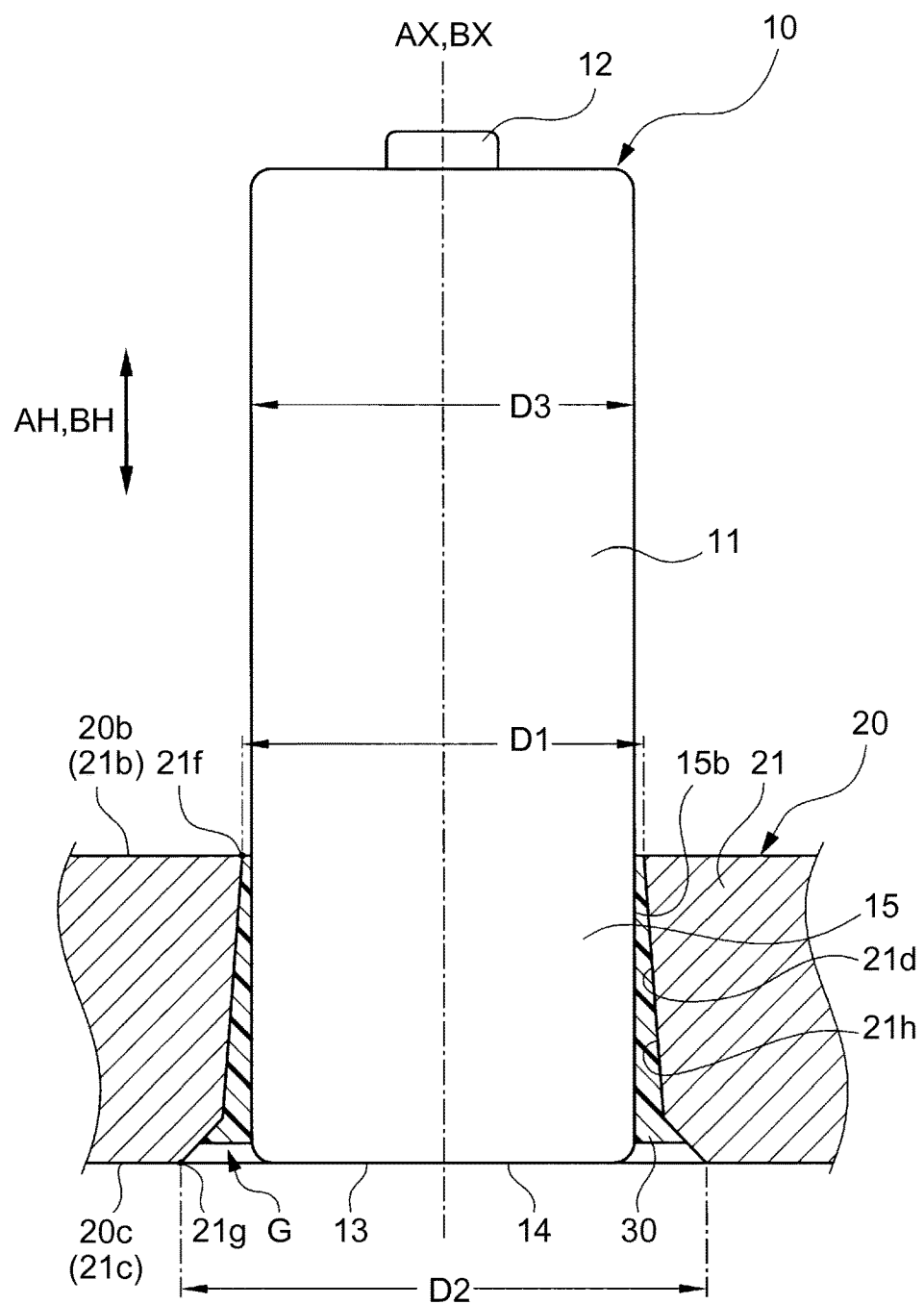
FIG. 2 is an enlarged partial sectional view of the assembled battery.

Next will be described Embodiment 1 of the present invention with reference to the drawings. FIG. 1 is a perspective view of an assembled battery 1 according to Embodiment 1. FIG. 2 is an enlarged partial sectional view of the assembled battery 1. As illustrated in FIG. 1, the assembled battery 1 of Embodiment 1 includes a holder 20 and a plurality of cells 10 fixed to the holder 20.

The cell 10 is a cylindrical (pillar-shaped) lithium-ion secondary battery (more specifically, a 18650-type lithium-ion secondary battery). The cell 10 is a single cell, and includes a cylindrical battery outer case 11, and an electrode body (not shown) and a nonaqueous electrolyte (not shown) accommodated inside the battery outer case 11. The electrode body is a wound electrode body formed such that a belt-shaped separator (not shown) is provided between a belt-shaped positive plate (not shown) and a belt-shaped negative plate (not shown), and then wound in a cylindrical manner.

A projecting positive terminal 12 electrically connected to the positive plate of the electrode body inside the cell is provided in one end surface (a top face in FIGS. 1 and 2) of the cell 10 in an axis direction AH (a direction along an axis AX of the cell 10, an up-down direction in FIGS. 1 and 2). Further, the other end surface (a lower face in FIGS. 1 and 2, a bottom face 14) of the cell 10 in the axis direction AH serves as a negative terminal 13 electrically connected to the negative plate of the electrode body inside the cell.

Figure 3:
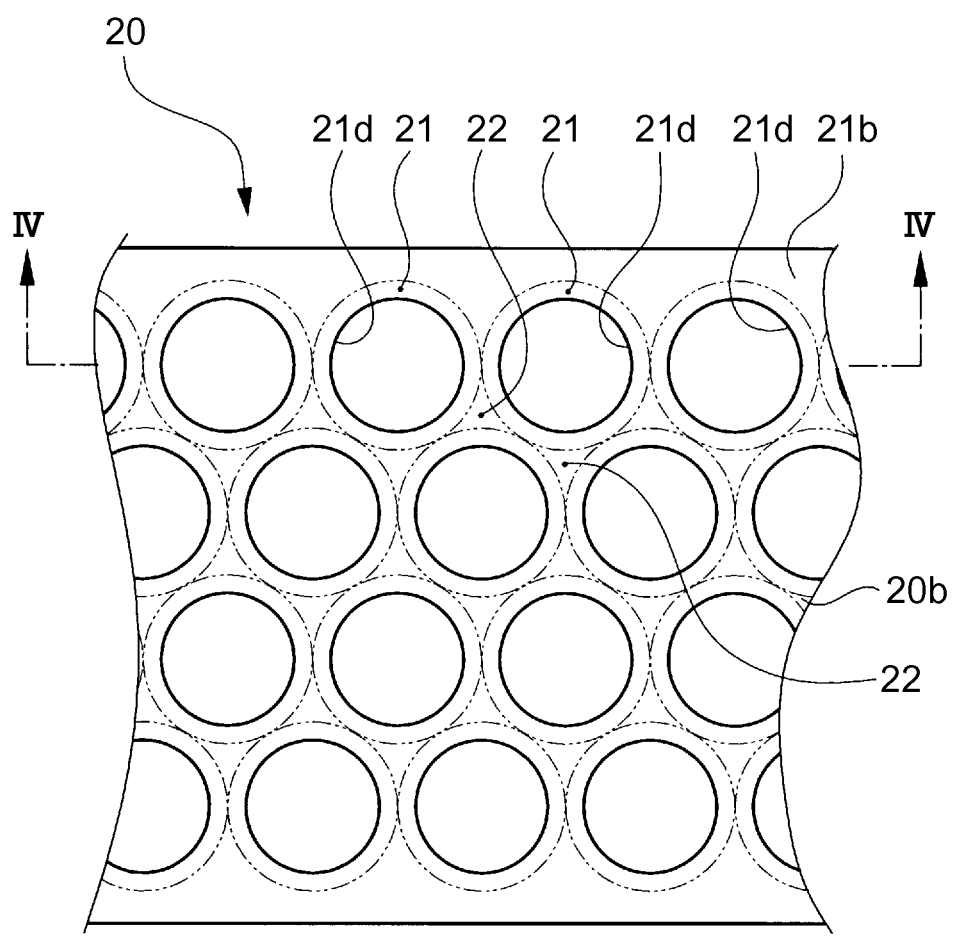
FIG. 3 is a plan view of a holder.

The holder 20 is made of a metal member (more specifically, aluminum) having a single-plate shape (see FIG. 1), and includes a first surface 20b and a second surface 20c that faces an opposite side to the first surface 20b. As illustrated in FIG. 3, the holder 20 includes a plurality of (the same number as the number of cells 10) cell hold portions 21 having a cylindrical shape, and a connection portion 22 that connects the cell hold portions 21 to each other. Note that, in the holder 20 of the present embodiment, the plurality of cell hold portions 21 and the connection portion 22 are formed integrally by one member. In FIG. 3, a boundary to distinguish the cell hold portion 21 from the connection portion 22 is indicated by an alternate long and two short dashes line, but actually, such a boundary line does not exist between the cell hold portion 21 and the connection portion 22.

Figure 4:
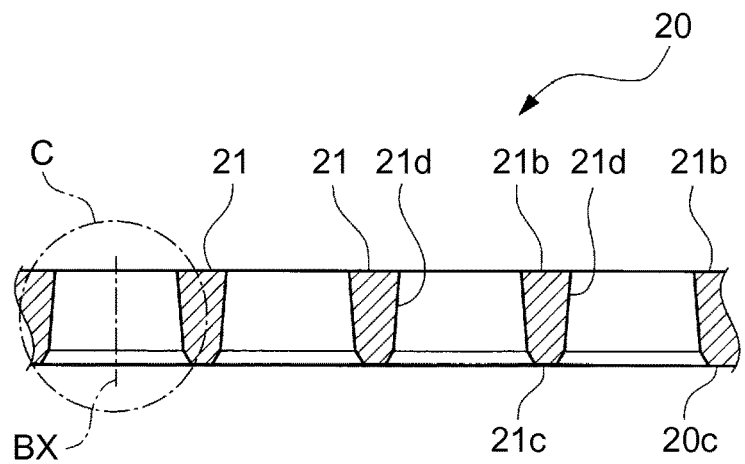
FIG. 4 is a sectional view taken along a line IV-IV in FIG. 3.

The cell hold portion 21 has a cylindrical shape, and has a first surface 21b and a second surface 21c that faces an opposite side to the first surface 21b (see FIG. 4). Note that, in Embodiment 1, the first surface 21b of the cell hold portion 21 is a part of the first surface 20b of the holder 20, and the second surface 21c of the cell hold portion 21 is a part of the second surface 20c of the holder 20. A cylindrical holding hole 21d, which is a hole penetrating through between the first surface 21b and the second surface 21c, is formed in the cell hold portion 21 (see to FIGS. 3 and 4). Note that, in Embodiment 1, the holding hole 21d can be called a hole penetrating through between the first surface 20b and the second surface 20c of the holder 20. Accordingly, it may be said that a plurality of (the same number as the number of cells 10) cylindrical holding holes 21d, which are holes penetrating through between the first surface 20b and the second surface 20c, is formed in the holder 20. These holding holes 21d are arranged in a hound's tooth check, in a plan view of the holder 20.

Note that, in Embodiment 1, an outside diameter D3 of the cell 10 is made smaller than a minimum inside diameter (more specifically, an inside diameter D1 of a first open end 21f, which is an open end of the holding hole 21d on a first-surface-21b side) of the holding hole 21d, as illustrated in FIG. 2. This allows the cell 10 to be inserted into the holding hole 21d. More specifically, part of the cell 10 is inserted into the holding hole 21d.

Further, as illustrated in FIG. 2, the assembled battery 1 of Embodiment 1 includes an adhesive 30 injected and solidified in a gap G between an outer peripheral surface 15b of that part (referred to as a held portion 15) of the cell 10 which is placed inside the holding hole 21d and that inner peripheral surface 21h of the cell hold portion 21 which constitutes the holding hole 21d. Hereby, each of the cells 10 is fixed to the holder 20 in a state where the each of the cells 10 is held by each of the cell hold portions 21 via the adhesive 30 (joined, via the adhesive, to the inner peripheral surface 21h that constitutes the holding hole 21d). Accordingly, in the assembled battery 1 of Embodiment 1, even if a vibration or an impact is applied to the assembled battery 1, the cell 10 does not move in a radial direction (a right-left direction in FIG. 2) of the holding hole 21d and in an axis direction BH (an up-down direction in FIG. 2) thereof, which does not cause rattling between the cell 10 and the cell hold portion 21. Thus, the assembled battery 1 of Embodiment 1 is an assembled battery in which the cells 10 are surely fixed to the holder 20 (the holding holes 21d).

Figure 5:
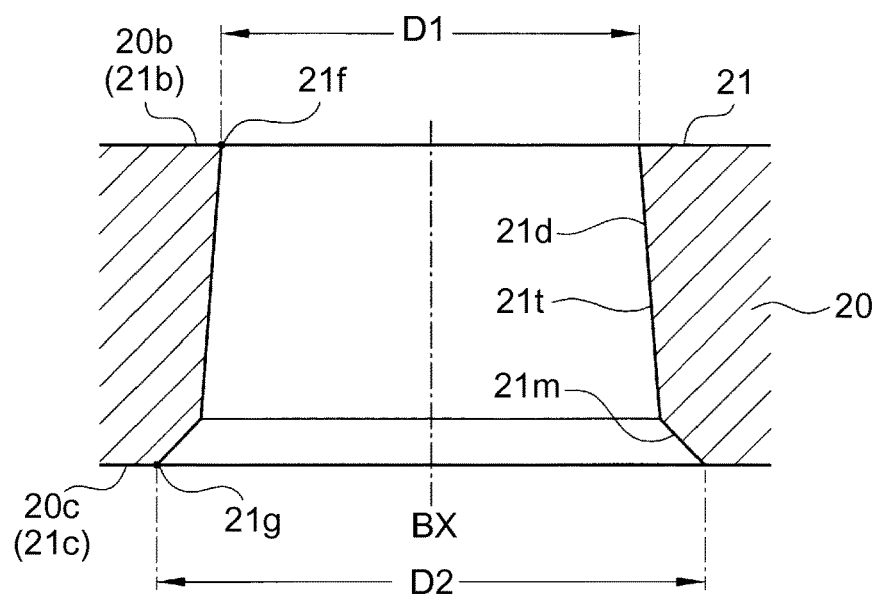
FIG. 5 is an enlarged view of a part C in FIG. 4.

Further, in the assembled battery 1 of Embodiment 1, the cell hold portion 21 is configured such that the inside diameter D1 of the circular first open end 21f, which is an open end of the holding hole 21d on the first-surface-21b side, is made smaller than an inside diameter D2 of a circular second open end 21g, which is an open end of the holding hole 21d on a second-surface-21c side (see FIGS. 2, 5). As such, since the inside diameter D2 (a diameter) of the second open end 21g is made larger than the inside diameter D1 (a diameter) of the first open end 21f, the adhesive 30 easily comes inside the gap G at the time when the adhesive 30 is injected into the gap G from a second-surface-21c side of the cell hold portion 21 (see FIG. 7) in a state where the second surface 21c of the cell hold portion 21 is directed upward (the first surface 21b is directed downward), as will be described later. Moreover, since the inside diameter D1 of the first open end 21f is smaller than the inside diameter D2 of the second open end 21g, the adhesive 30 thus injected from the second-surface-21c side is hard to drop downward from the first-surface-21b side at the time when the adhesive 30 is injected into the gap G as described above.

Besides, in the assembled battery 1 of Embodiment 1, that inner peripheral surface 21h of the cell hold portion 21 which constitutes the holding hole 21d includes a tapered surface 21t having an inside diameter that is increased from the first-surface-21b side toward the second-surface-21c side (see FIG. 5). On this account, when the adhesive 30 is injected into the gap G (see FIG. 7) as described above, the adhesive 30 thus injected from the second-surface-21c side easily flows toward the first-surface-21b side along the tapered surface 21t, which makes it easy for the adhesive 30 to be filled into the gap G. Hereby, the adhesive 30 can be sufficiently filled into the gap G. Accordingly, the assembled battery 1 of Embodiment 1 becomes an assembled battery 1 in which the adhesive 30 is sufficiently filled into the gap G, and thus, is an assembled battery in which the cells 10 are more surely fixed to the holder 20 (the holding holes 21d).

Further, in the assembled battery 1 of Embodiment 1, chamfering (more specifically, C-chamfering) is performed on a second open end portion 21m including the second open end 21g of the cell hold portion 21 (that end part of the inner peripheral surface 21h constituting the holding hole 21d which is on the second-surface-21c side). In other words, the second open end portion 21m, which is the end part, on the second-surface-21c side, of the inner peripheral surface 21h constituting the holding hole 21d, is a chamfered surface (see FIG. 5). On this account, when the adhesive 30 is injected into the gap G from the second-surface-21c side of the cell hold portion 21 in a state where the second surface 21c of the cell hold portion 21 is directed upward (the first surface 21b is directed downward), the adhesive 30 easily comes inside the gap G. Hereby, the adhesive 30 can be appropriately filled into the gap G. Accordingly, the assembled battery 1 of Embodiment 1 becomes an assembled battery in which the adhesive 30 is appropriately filled into the gap G, and thus, is an assembled battery in which the cells 10 are more surely fixed to the holder 20 (the holding holes 21d).

Figure 6:
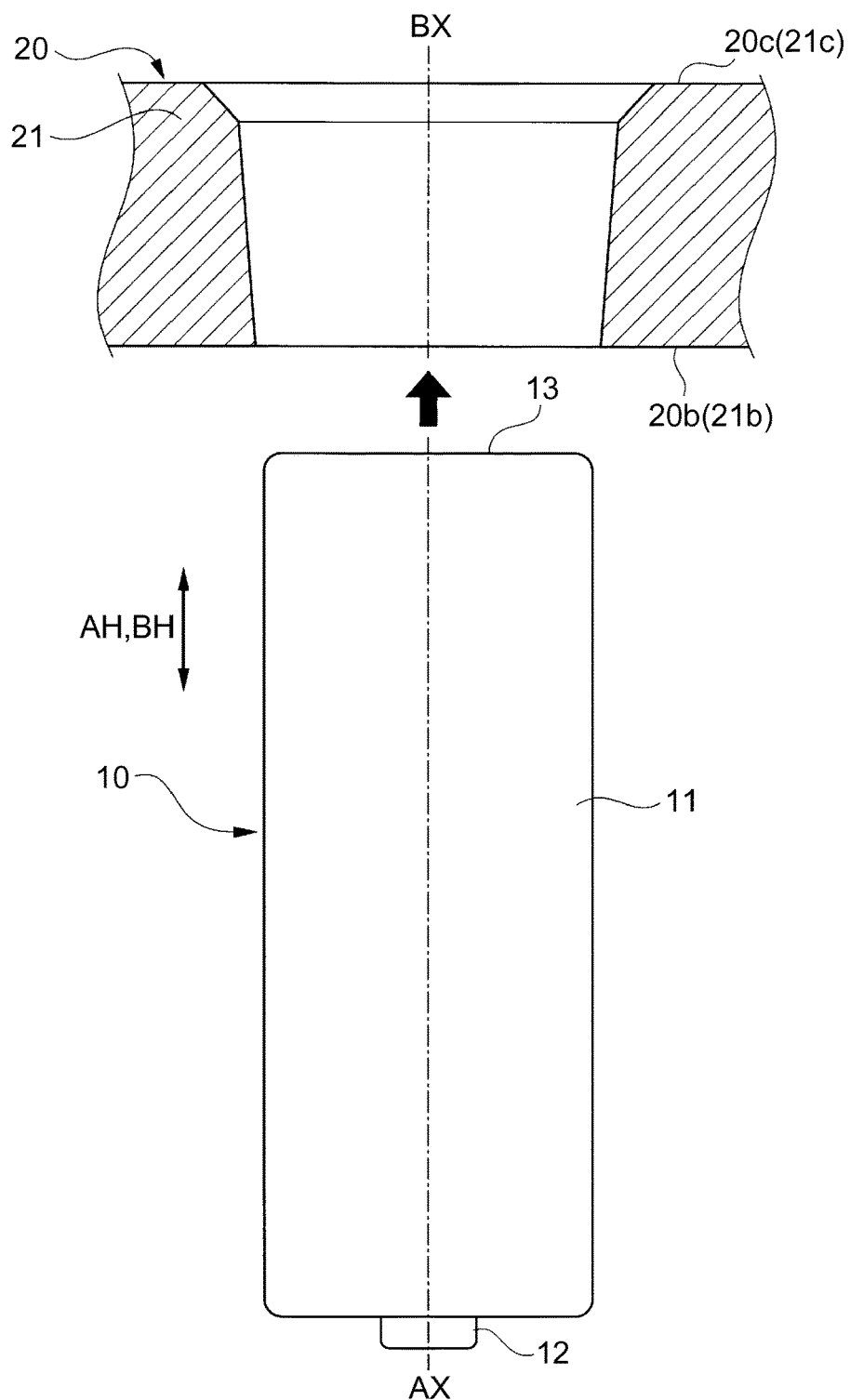
FIG. 6 is a view to describe a cell insertion step according to Embodiment 1.

Next will be described a manufacturing method of an assembled battery according to Embodiment 1. First, a predetermined number of cells 10 and a holder 20 are prepared. Then, in a cell insertion step, the cell 10 is inserted into a holding hole 21d of a cell hold portion 21 of the holder 20, as illustrated in FIG. 6. More specifically, in a state where a second surface 21c of the cell hold portion 21 is directed upward (a first surface 21b is directed downward), that is, in a state where a second surface 20c of the holder 20 is directed upward (a first surface 20b is directed downward), the cell 10 is inserted into the holding hole 21d from a first-surface-21b side of the cell hold portion 21 (a first-surface-20b side of the holder 20). Note that the cell 10 is inserted into the holding hole 21d from a negative-terminal-13 side (a bottom-face-14 side), and in a state where a position of a negative terminal 13 (a bottom face 14) accords with the second surface 21c of the cell hold portion 21 (the second surface 20c of the holder 20) in an axis direction BH, the cell 10 is temporarily held by a jig (not shown) (see FIG. 7).

Figure 7:
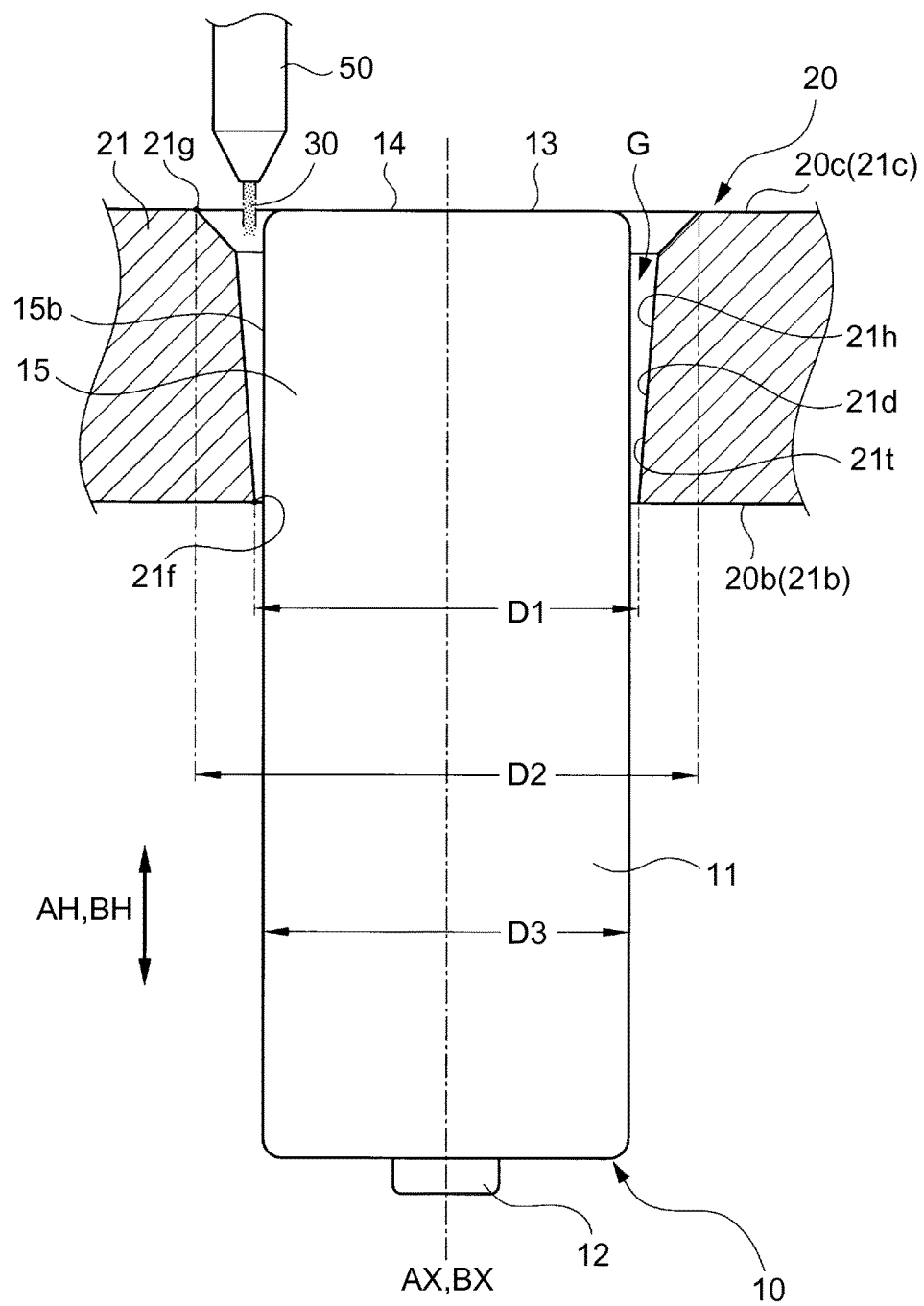
FIG. 7 is a view to describe an adhesive injection step.

Subsequently, the process proceeds to an adhesive injection step, in which an adhesive 30 is injected into a gap G between an outer peripheral surface 15b of that part (a held portion 15) of the cell 10 which is placed inside the holding hole 21d and that inner peripheral surface 21h of the cell hold portion 21 which constitutes the holding hole 21d. More specifically, as illustrated in FIG. 7, the adhesive 30 is injected into the gap G from a second-surface-21c side of the cell hold portion 21 (the second surface 20c of the holder 20) in a state where the second surface 21c of the cell hold portion 21 is directed upward (the first surface 21b is directed downward). Note that, in Embodiment 1, a nozzle 50 connected to a dispenser (not shown) is placed above the cell hold portion 21 (the gap G) of the holder 20, and the adhesive 30 discharged downward from the nozzle 50 is injected into the gap G.

In the meantime, in Embodiment 1, the liquid adhesive 30 having a viscosity in a range of 1 to 500 mPa·s is injected into the gap G in the adhesive injection step. By injecting such a low-viscosity adhesive 30, the adhesive 30 easily comes inside the gap G, which allows the adhesive 30 to be filled into the gap G, appropriately (see FIG. 8).

Further, in Embodiment 1, the holder 20 in which "the cell hold portion 21 is configured such that the inside diameter D1 of the first open end 21f, which is an open end of the holding hole 21d on the first-surface-21b side, is made smaller than the inside diameter D2 of the second open end 21g, which is an open end of the holding hole 21d on a second-surface-21c side" is used (see FIG. 7). Since the inside diameter D2 (the diameter) of the second open end 21g is made larger than the inside diameter D1 (the diameter) of the first open end 21f as such, the adhesive 30 easily comes inside the gap G at the time when the adhesive 30 is injected into the gap G from the second-surface-21c side of the cell hold portion 21 as described above. Further, since the inside diameter D1 of the first open end 21f is smaller than the inside diameter D2 of the second open end 21g, the adhesive 30 thus injected from the second-surface-21c side is hard to drop downward from the first-surface-21b side at the time when the adhesive 30 is injected into the gap G, as described above.

Besides, the holder 20 to be used in Embodiment 1 is configured such that "that inner peripheral surface 21h of the cell hold portion 21 which constitutes the holding hole 21d includes the tapered surface 21t having an inside diameter that is increased from the first-surface-21b side toward the second-surface-21c side" (see FIG. 7). On this account, when the adhesive 30 is injected into the gap G in the adhesive injection step, the adhesive 30 thus injected from the second-surface-21c side easily flows toward the first-surface-21b side along the tapered surface 21t. Hereby, the adhesive 30 is easily filled into the gap G, thereby making it possible to sufficiently fill the adhesive 30 into the gap G.

Further, the holder 20 to be used in Embodiment 1 is configured such that chamfering (more specifically, C-chamfering) is performed on the second open end portion 21m including the second open end 21g of the cell hold portion 21 (that end part of the inner peripheral surface 21h constituting the holding hole 21d which is on the second-surface-21c side). In other words, the second open end portion 21m, which is the end part, on the second-surface-21c side, of the inner peripheral surface 21h constituting the holding hole 21d, is a chamfered surface. On this account, in the adhesive injection step, when the adhesive 30 is injected into the gap G from the second-surface-21c side of the cell hold portion 21 in a state where the second surface 21c of the cell hold portion 21 is directed upward (the first surface 21b is directed downward), the adhesive 30 easily comes inside the gap G. Hereby, the adhesive 30 can be appropriately filled into the gap G.

Figure 8:
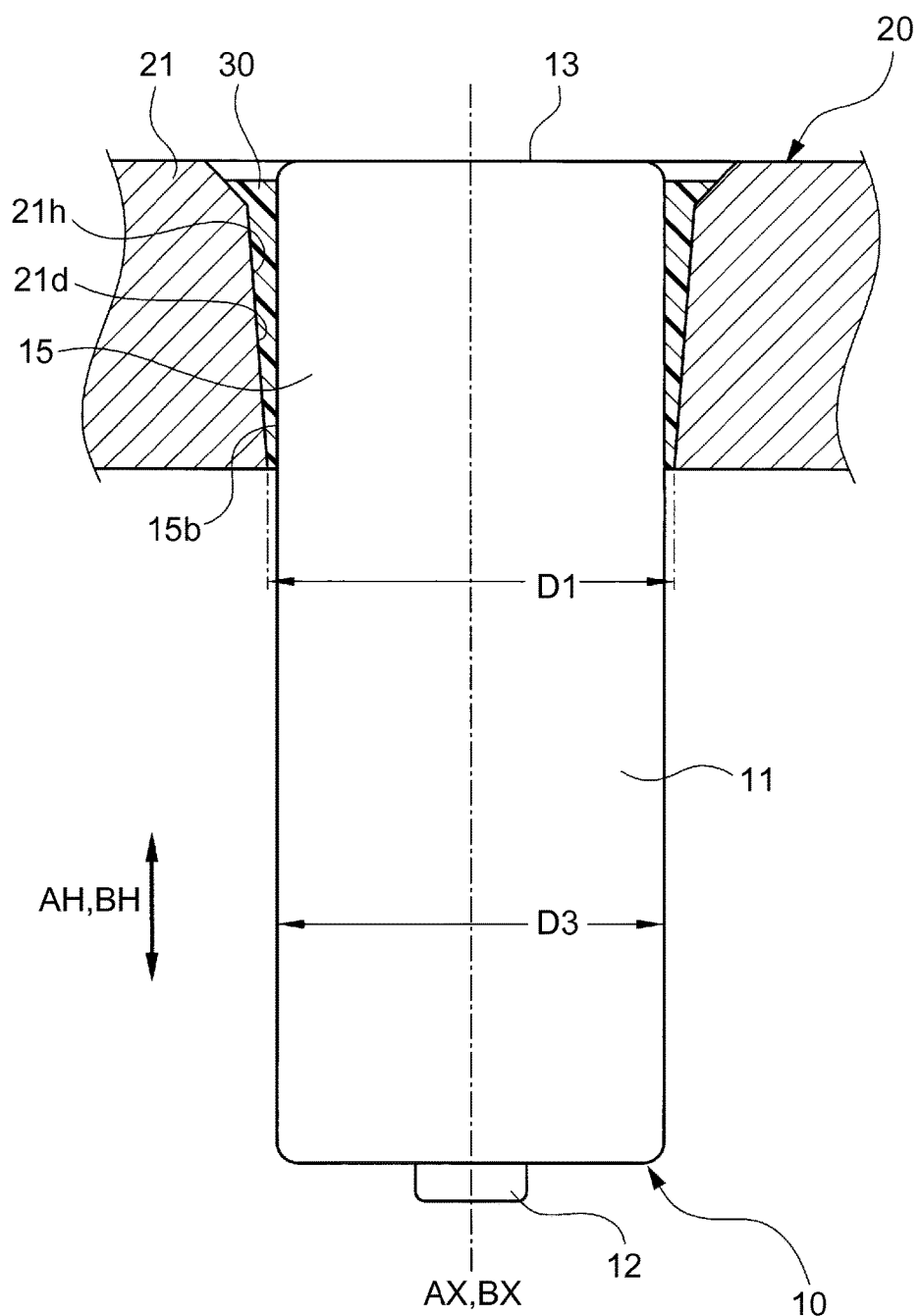
FIG. 8 is a view to describe a manufacturing method of an assembled battery.

After that, as illustrated in FIG. 8, the adhesive 30 thus injected solidifies (the adhesive is solidified), so that each of the cells 10 is fixed to the holder 20 in a state where the each of the cells 10 is held by each of the cell hold portions 21 via the adhesive 30 (joined, via the adhesive 30, to the inner peripheral surface 21h that constitutes the holding hole 21d). Thus, according to the manufacturing method of Embodiment 1, the cells 10 can be surely fixed to the holder 20 (the holding holes 21d).

Accordingly, in the assembled battery 1 thus manufactured by the manufacturing method of Embodiment 1, even if a vibration or an impact is applied to the assembled battery 1, the cell 10 does not move in a radial direction (a right-left direction in FIG. 8) of the holding hole 21d and in an axis direction BH (an up-down direction in FIG. 8) thereof, which does not cause rattling between the cell 10 and the cell hold portion 21.

(Adhesive Injection Test) Next will be described an adhesive injection test. In the test, a plurality of adhesives having different viscosities was prepared, and a viscosity range that allows the adhesive 30 to be appropriately filled into the gap G was examined by use of these adhesives.

Figure 9:
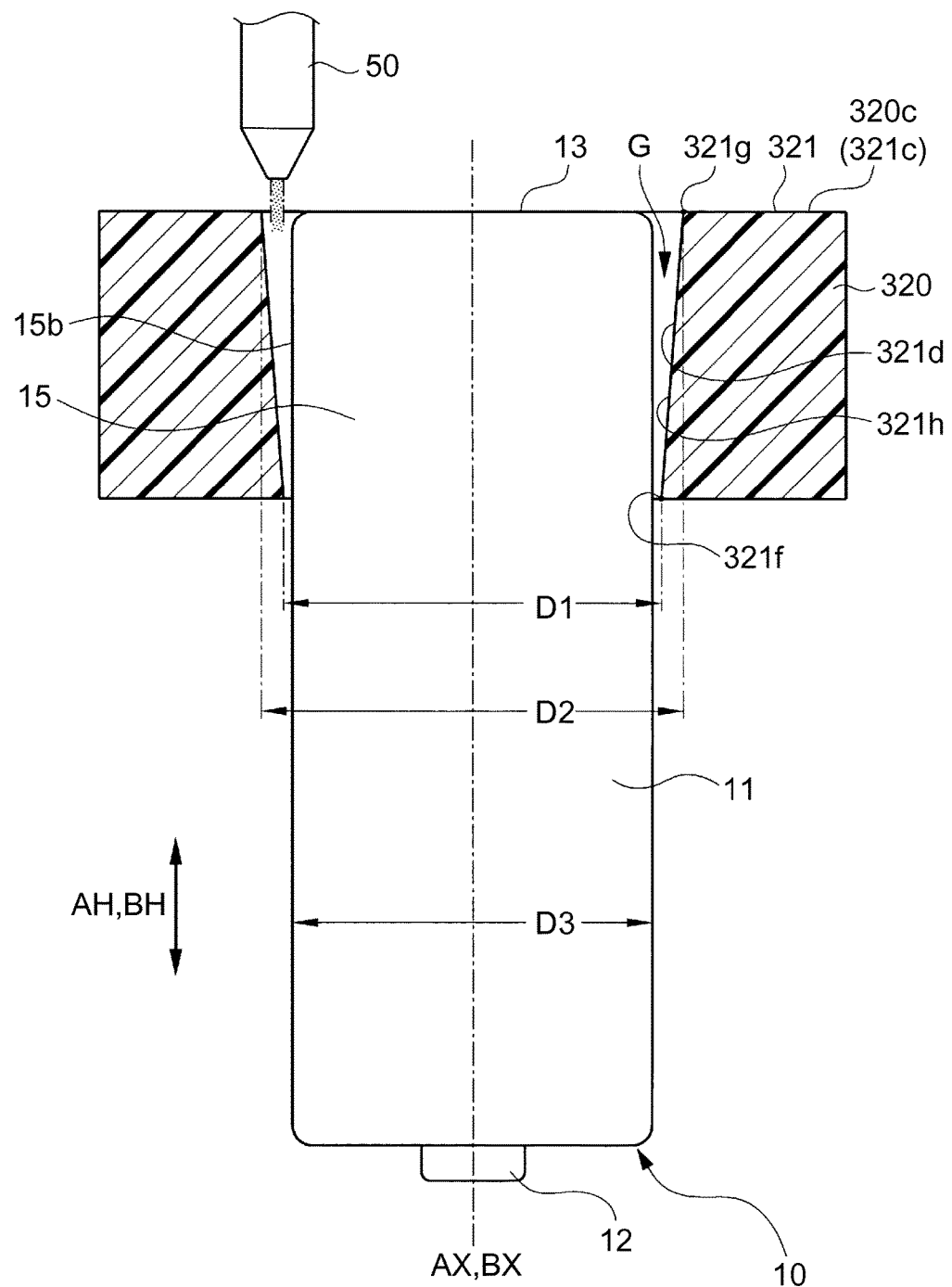
FIG. 9 is a view to describe an adhesive injection test.

More specifically, 11 types of adhesives (referred to as Samples 1 to 11) and water (referred to as Sample 12) were prepared, and a test to inject these adhesives into the gap G was performed. Note that, in the test, as illustrated in FIG. 9, with the use of a nozzle 50 similarly to the one used in the adhesive injection step of Embodiment 1 and a dispenser, a sample was injected into the gap G from a second-surface-321c side of a cell hold portion 321 (a second-surface-320c side of a holder 320) in a state where a second surface 321c of the cell hold portion 321 was directed upward. However, differently from the holder 20 of Embodiment 1, a colorless and transparent acrylic holder 320 was used as the holder 320 in the test. This is because a state of a sample injected into the gap G was to be observed by visual inspection from outside. The holder 320 was a cylindrical holder having only one cell hold portion 321 (a holding hole 321d).

Further, the holding hole 321d of the holder 320 was configured such that an inside diameter D1 of a first open end 321f was 18.6 mm and an inside diameter D2 of a second open end 321g was 18.9 mm. Further, a whole inner peripheral surface 321h constituting the holding hole 321d was a tapered surface, and its taper angle was 1 degree. Further, an outside diameter D3 of the cell 10 was 18.25 mm. Further, a volume of a gap G between an outer peripheral surface 15b of a held portion 15 of the cell 10 and the inner peripheral surface 321h of the cell hold portion 321 was 229 mm$^3$. Note that, in the test, an injection amount of each sample was 280 mm$^3$. As such, since the injection amount was larger than the volume of the gap G, a sample filled into the gap G was held in a state where the sample was expanded upward and downward in the gap G (the holding hole 321d) due to a surface tension.

Here, results of the injection test of Samples 1 to 12 are shown in Table 1. Note that a viscosity of each sample was a viscosity at a room temperature (25° C.), and the injection test was performed also at the room temperature (25° C.).

TABLE 1

|  | Property | Viscosity (mPas) | Fillability | Bubbles | Drops | Time (Second) |
|---|---|---|---|---|---|---|
| Sample 1 | Instantaneous Adhesive | 40 | ○ | No | No | 0.5 or less |
| Sample 2 | Instantaneous Adhesive | 300 | ○ | No | No | 15 |
| Sample 3 | Anaerobic Property | 20 | ○ | No | No | 0.5 or less |
| Sample 4 | Anaerobic Property | 4000 | x | — | — | — |
| Sample 5 | Two-part Epoxy | 1000 | x | — | — | — |
| Sample 6 | Two-part Epoxy | 500 | ○ | No | No | 30 |
| Sample 7 | Two-part Epoxy | 30 | ○ | No | No | 0.5 or less |
| Sample 8 | Two-part Epoxy | 100 | ○ | No | No | 6 |
| Sample 9 | Two-part Epoxy | 260 | ○ | No | No | 20 |
| Sample 10 | One-part Epoxy | 150 | ○ | No | No | 10 |
| Sample 11 | UV Curing | 30 | ○ | No | No | 0.5 or less |
| Sample 12 | Water | 1 | ○ | No | No | 0.5 or less |

As shown in Table 1, each of Samples 1 to 3, 6 to 12 having a viscosity in the range of 1 to 500 mPa·s could be injected into the gap G appropriately, and thus, the gap G could be filled with the each of Samples (fillability was evaluated as a circle mark in Table 1). In contrast, each of Samples 4, 5 having a viscosity of 500 mPa·s or more could not be injected into the gap G appropriately, and thus, the gap G could not be filled with the each of Samples (fillability was evaluated as a cross mark in Table 1).

Further, when it was checked whether or not bubbles existed in each of the samples filled in the gap G, no bubbles existed in terms of Samples 1 to 3, 6 to 12 having a viscosity in the range of 1 to 500 mPa·s (no bubbles in Table 1). Further, in terms of Samples 1 to 3, 6 to 12 having a viscosity in the range of 1 to 500 mPa/s, a sample filled into the gap G did not drop downward from the gap G (the first-open-end-321f side) (no drop in Table 1). From these results, it can be said that the viscosity of the adhesive to be injected in the adhesive injection step is preferably within the range of 1 to 500 mPa·s.

Further, when times (TIME in Table 1) required from start of injection of respective samples to completion of the injection thereof were compared with each other, the times were 0.5 seconds or less in terms of Samples 1, 3, 7, 11, 12 having a viscosity in a range of 50 mPa·s or less. In contrast, in terms of Samples 2, 6, 8 to 10 having a viscosity of 100 mPa·s or more, their injection times were 6 seconds or more. From this result, it can be said that the viscosity of the adhesive to be injected in the adhesive injection step is preferably 50 mPa·s or less. This is because, by injecting the adhesive having a viscosity of 50 mPa·s or less, the injection time can be shortened extremely, so that a production time of an assembled battery can be shortened.

Embodiment 2

Figure 10:
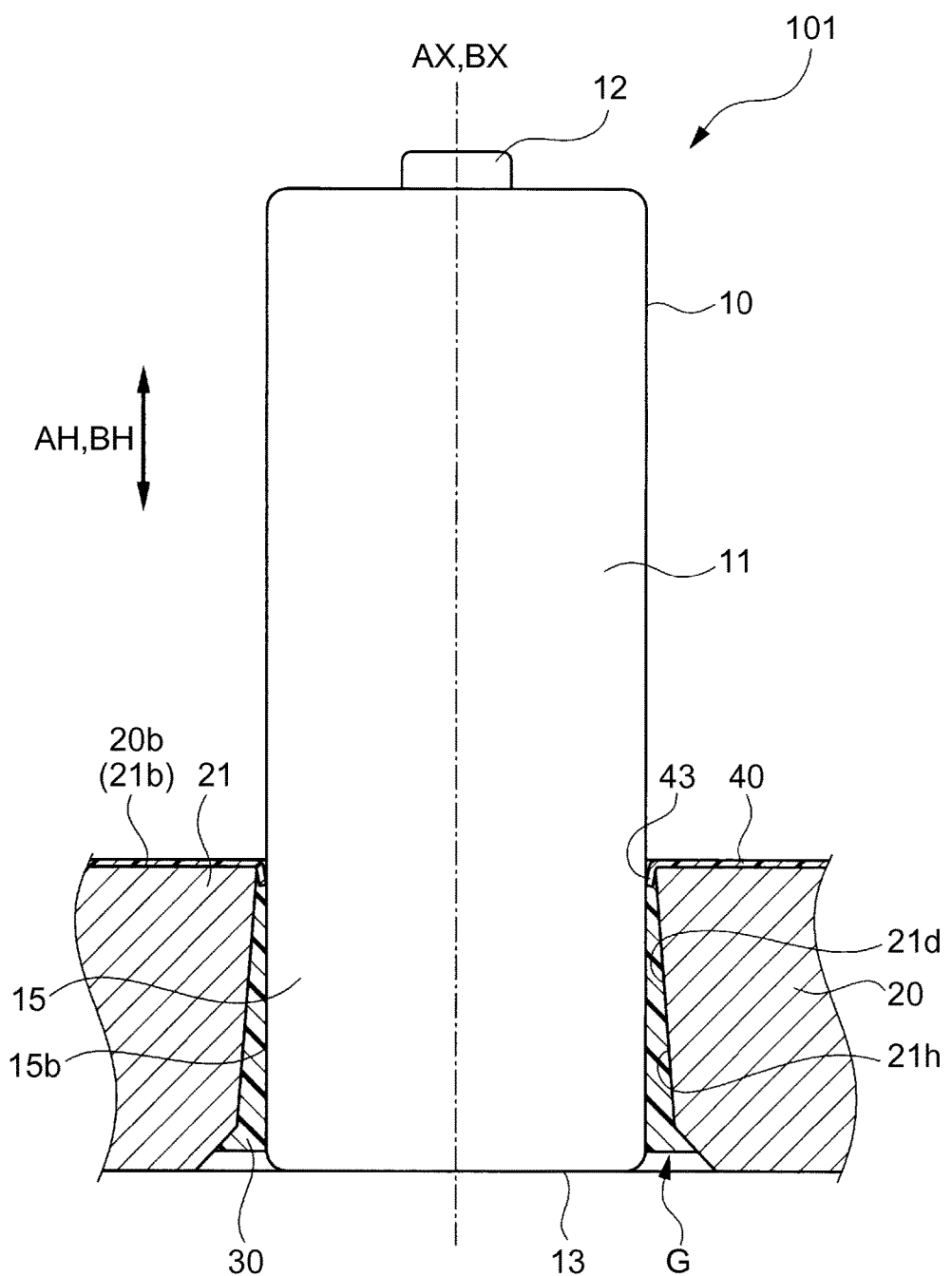
FIG. 10 is an enlarged partial sectional view of an assembled battery according to Embodiment 2.

Next will be described Embodiment 2 of the present invention with reference to the drawings. An assembled battery 101 of Embodiment 2 is different from Embodiment 1 only in that one resin sheet 40 is added as illustrated in FIG. 10, and the other configuration is the same as above. Note that FIG. 10 is an enlarged partial sectional view of the assembled battery 101 according to Embodiment 2, and is an enlarged partial sectional view of one cell 10 and its vicinity.

Figure 11:
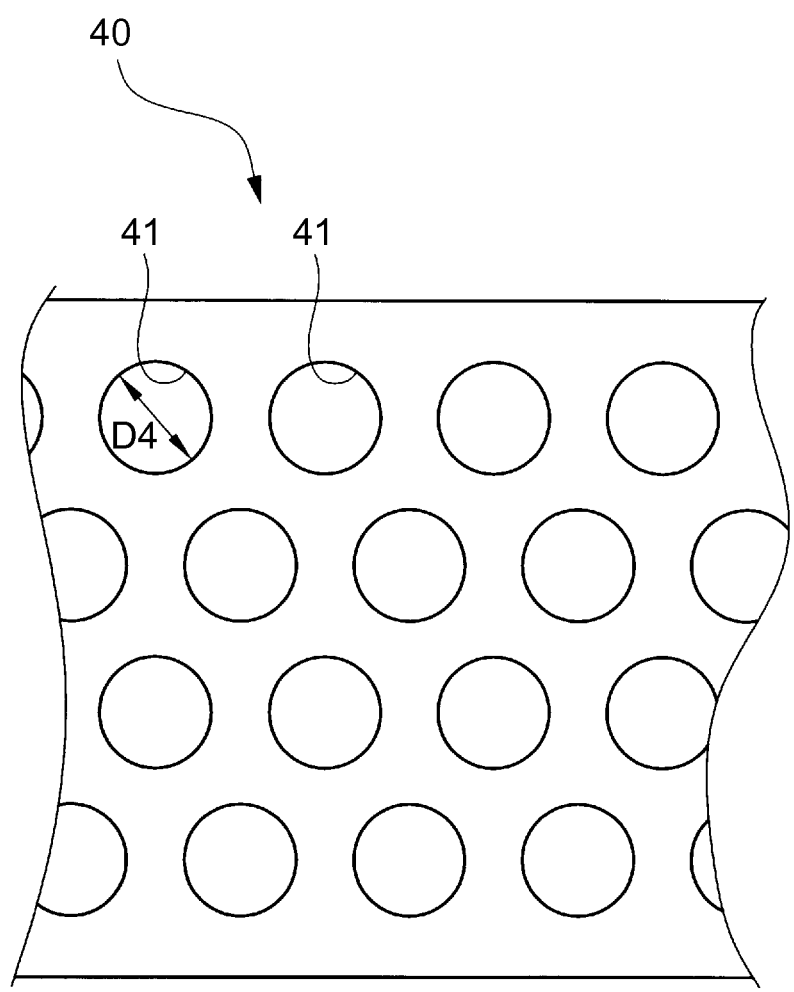
FIG. 11 is a plan view of a resin sheet.

The assembled battery 101 of Embodiment 2 includes one resin sheet 40 provided so as to make contact with first surfaces 21b of a plurality of cell hold portions 21 (one resin sheet 40 adhered to the first surfaces 21b). In other words, one resin sheet is provided on a first surface 20b of a holder 20 (one resin sheet is adhered to the first surface 20b). As illustrated in FIG. 11, the resin sheet 40 has cylindrical through holes 41 penetrating therethrough. More specifically, the same number of through holes 41 as the number of holding holes 21d formed in the holder 20 is formed in the resin sheet 40. Moreover, each of the through holes 41 has an inside diameter D4 (a diameter D4) which is smaller than an inside diameter (more specifically, an inside diameter D1 of a first open end 21f, which is an open end of the holding hole 21d on a first-surface-21b side) of the holding hole 21d of the cell hold portion 21 and which is smaller than an outside diameter D3 of the cell 10 (see FIGS. 14, 15).

Figure 16:
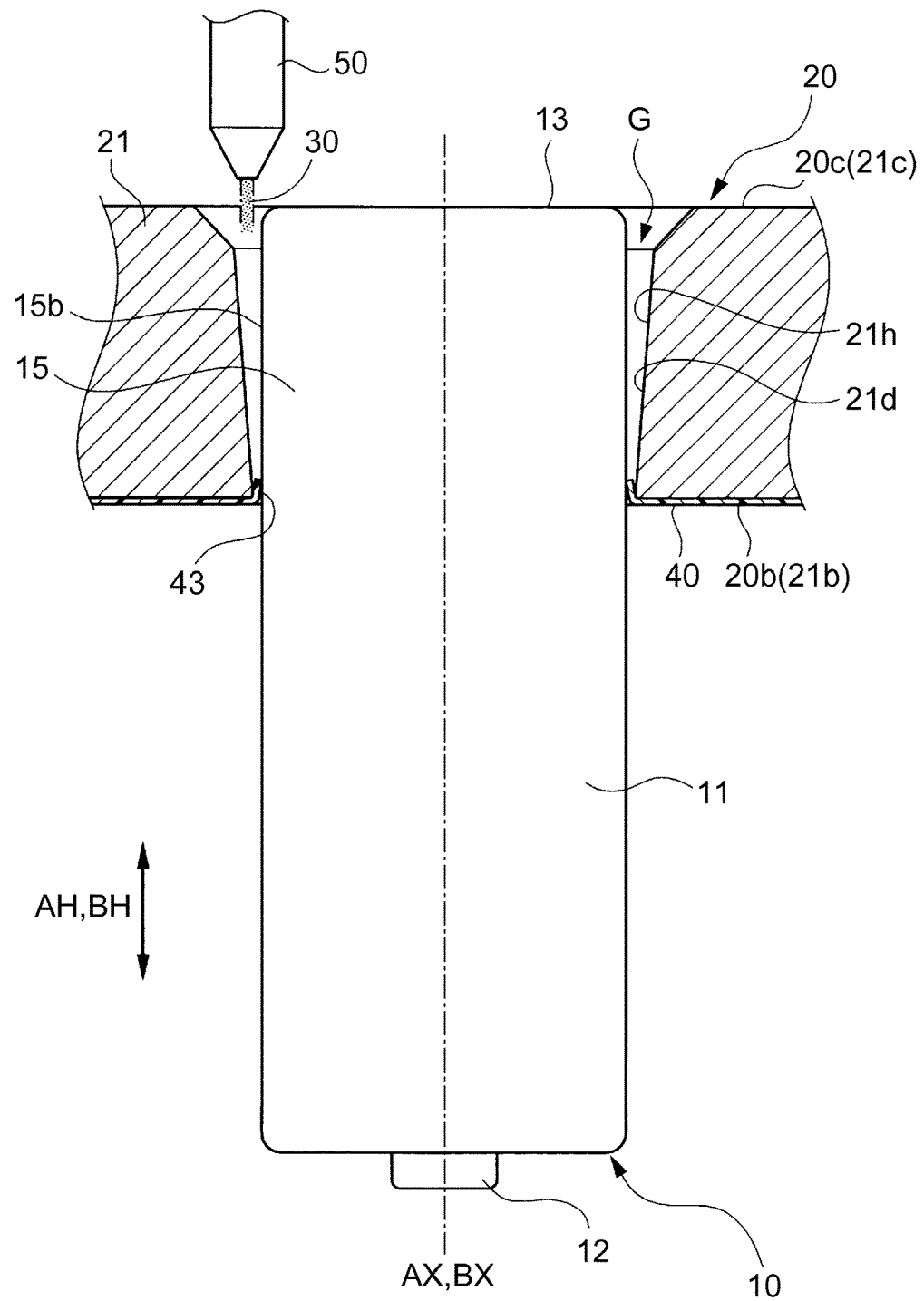
FIG. 16 is a view to describe the cell insertion step and an adhesive injection step according to Embodiment 2.

In a state where an annular hole surrounding portion 43 (that part of the resin sheet 40 whish is placed around the through hole 41) of the resin sheet 40 makes contact with an outer peripheral surface 15b of a held portion 15 of a cell 10 inserted into the holding hole 21d of the cell hold portion 21, the cell 10 is accommodated in the holding hole 21d (see FIGS. 10, 16). With such a configuration, the hole surrounding portion 43 of the resin sheet 40 can close an opening (an opening on a lower side in FIG. 16), on a first-surface-20b (21b) side, of a gap G between the outer peripheral surface 15b of the cell 10 and an inner peripheral surface 21h constituting the holding hole 21d.

Hereby, as illustrated in FIG. 16, when an adhesive 30 is injected into the gap G from a second-surface-21c side (an upper side in FIG. 16) of the cell hold portion 21 in a state where the second surface 21c of the cell hold portion 21 is directed upward (the first surface 21b is directed downward), it is possible to prevent the adhesive 30 thus injected from the second-surface-20c side from leaking from a first-surface-20b side (leaking downward in FIG. 16). Accordingly, the assembled battery 101 of Embodiment 2 becomes an assembled battery in which the adhesive 30 is sufficiently filled into the gap G, and thus, is an assembled battery in which the cells 10 are surely fixed to the holder 20 (the holding holes 21d).

Figure 12:
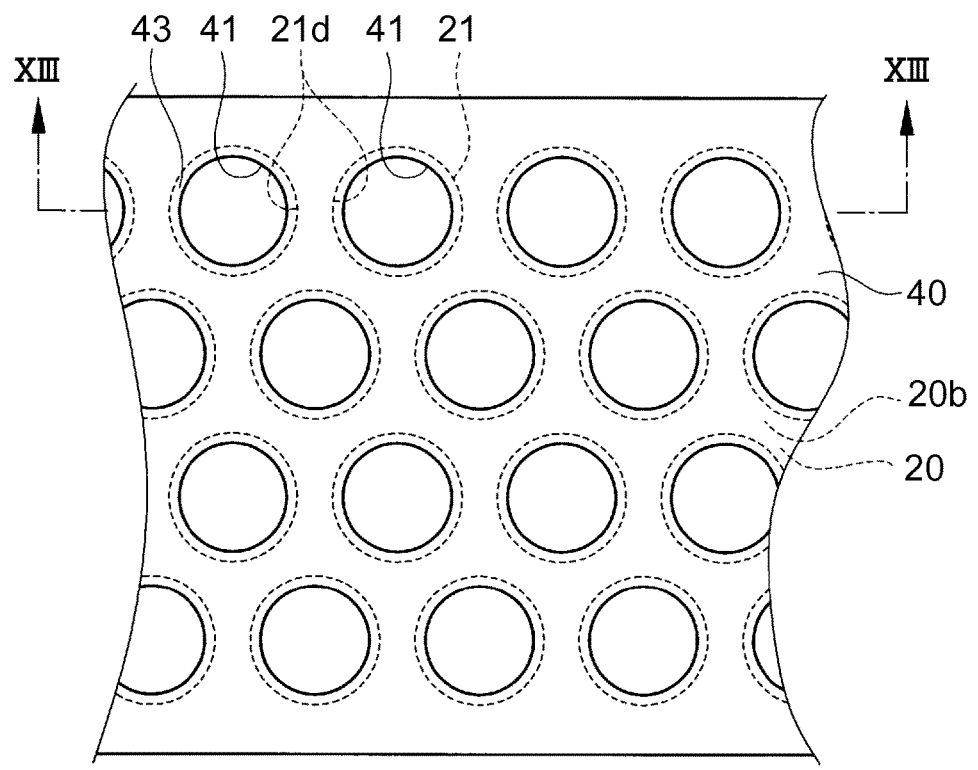
FIG. 12 is a view to describe a resin sheet setup step.
Figure 13:
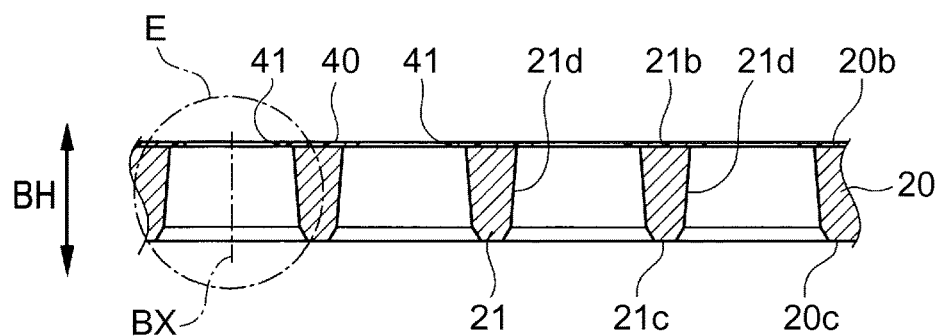
FIG. 13 is a sectional view taken along a line XIII-XIII in FIG. 12.
Figure 14:
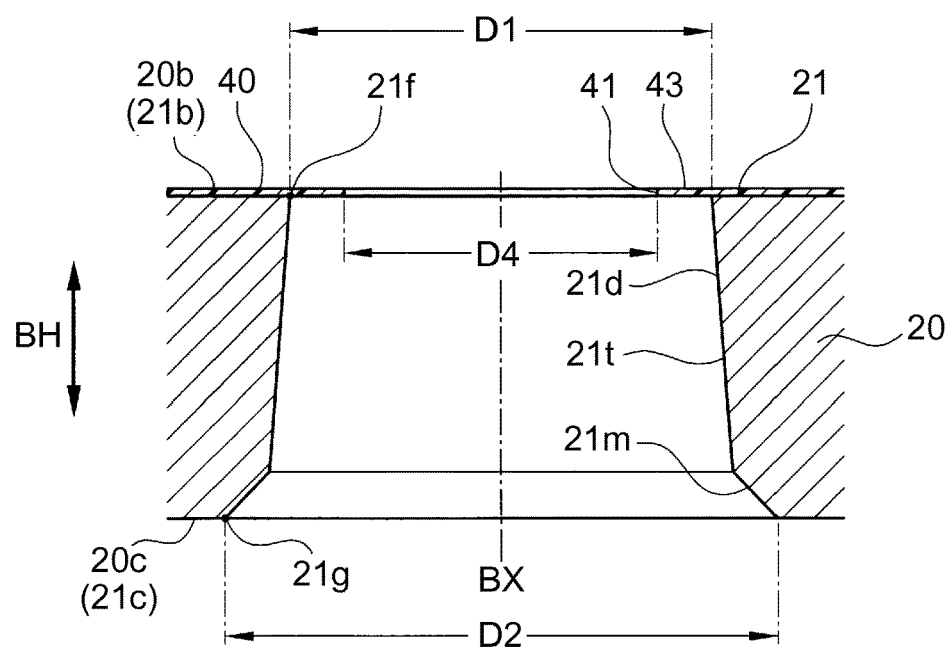
FIG. 14 is an enlarged view of a part E in FIG. 13.

Next will be described a manufacturing method of the assembled battery according to Embodiment 2. First, a predetermined number of cells 10 and a holder 20 are prepared. Further, one resin sheet 40 is prepared. Then, as illustrated in FIGS. 12 to 14, in a resin sheet setup step, the resin sheet 40 is placed so as to make contact with first surfaces 21b of a plurality of cell hold portions 21 (more specifically, the resin sheet 40 is adhered to a first surface 20b of the holder 20). More specifically, the resin sheet 40 is placed such that an annular hole surrounding portion 43 of the resin sheet 40 is put on a holding hole 21d in an axis direction BH of the holding hole 21d (a direction where the holding hole 21d extends, a direction perpendicular to a plane of paper in FIG. 12, an up-down direction in FIGS. 13 and 14). Note that through holes 41 of the resin sheet 40 are formed in a hound's tooth check like the holding holes 21d so that their respective axes accord with respective axes BX of the holding holes 21d of the holder 20.

Figure 15:
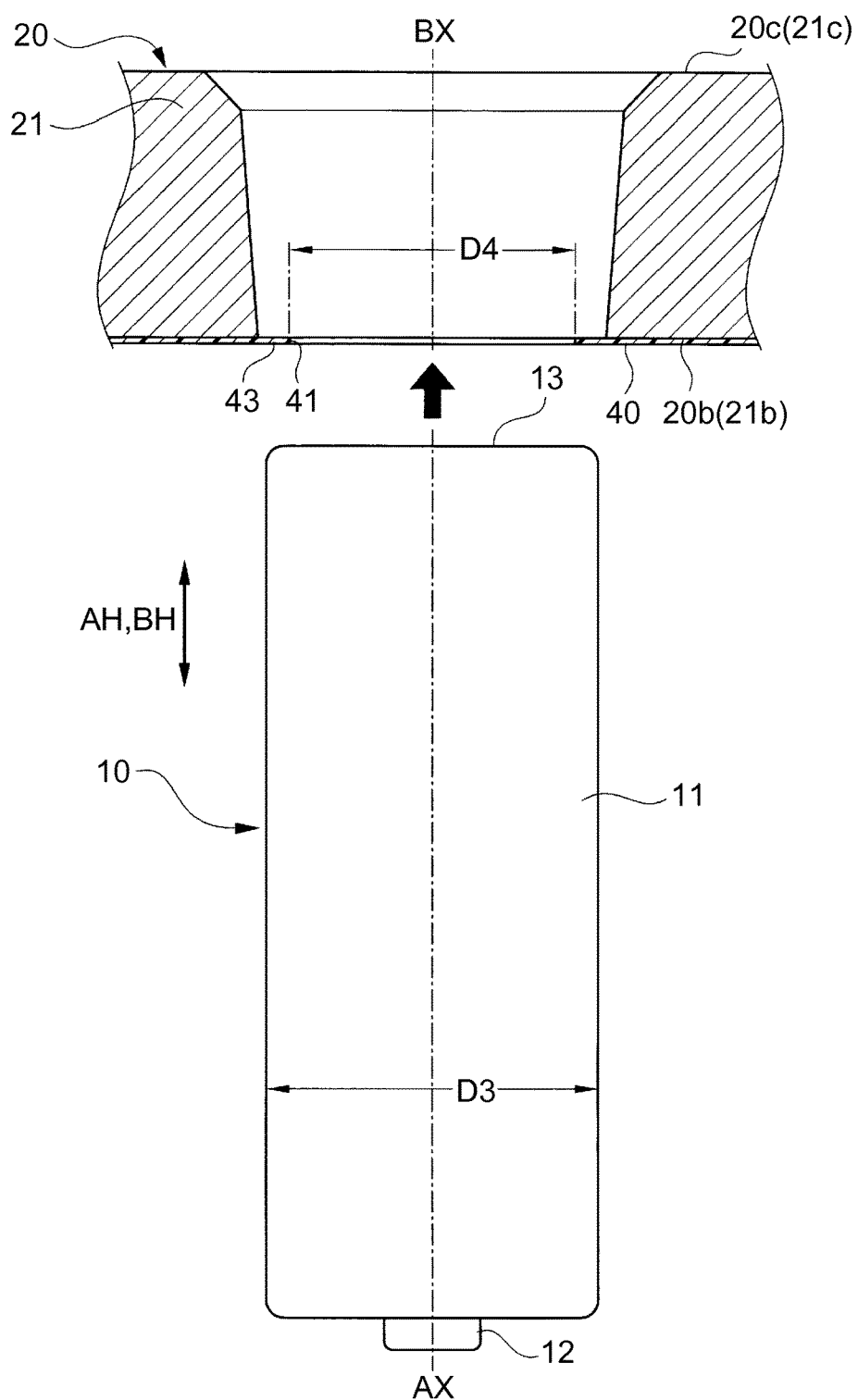
FIG. 15 is a view to describe a cell insertion step according to Embodiment 2.

After that, the process proceeds to a cell insertion step, in which the cell 10 is inserted into the holding hole 21d from a first-surface-21b side (from a lower side in FIG. 15) of the cell hold portion 21 in a state where a second surface 21c of the cell hold portion 21 is directed upward (the first surface 21b is directed downward), as illustrated in FIG. 15. Hereby, as illustrated in FIG. 16, the annular hole surrounding portion 43 of the resin sheet 40 is bent toward the second-surface-21c side (an upper side in FIG. 16) while making contact with the outer peripheral surface 15b of the cell 10 thus inserted into the holding hole 21d, and in a state where the annular hole surrounding portion 43 of the resin sheet 40 makes contact with the outer peripheral surface 15b of the cell 10, the cell 10 is accommodated in the holding hole 21d. Hereby, an opening, on the first-surface-21b side (on a lower side in FIG. 16), of a gap G between the outer peripheral surface 15b of the cell 10 and an inner peripheral surface 21h constituting the holding hole 21d can be closed by the hole surrounding portion 43 of the resin sheet 40.

Subsequently, the process proceeds to an adhesive injection step, in which, similarly to Embodiment 1, an adhesive 30 is injected into the gap G between the outer peripheral surface 15b of that part (a held portion 15) of the cell 10 which is placed inside the holding hole 21d and that inner peripheral surface 21h of the cell hold portion 21 which constitutes the holding hole 21d, as illustrated in FIG. 16.

Meanwhile, in Embodiment 2, the opening, on the first-surface-21b side (on the lower side in FIG. 16), of the gap G is closed by the hole surrounding portion 43 of the resin sheet 40 in the previous cell insertion step. Hereby, in the adhesive injection step, it is possible to prevent the adhesive 30 thus injected from leaking from the first-surface-21b (20b) side at the time when the adhesive 30 is injected into the gap G from the second-surface 21c (20c) side. This makes it possible to fill the adhesive 30 into the gap G, appropriately.

The present invention has been described above in line with embodiments (Embodiments 1, 2), but the present invention is not limited to the above embodiments and can be modified and applied appropriately without departing from the gist of the present invention.

Figure 17:
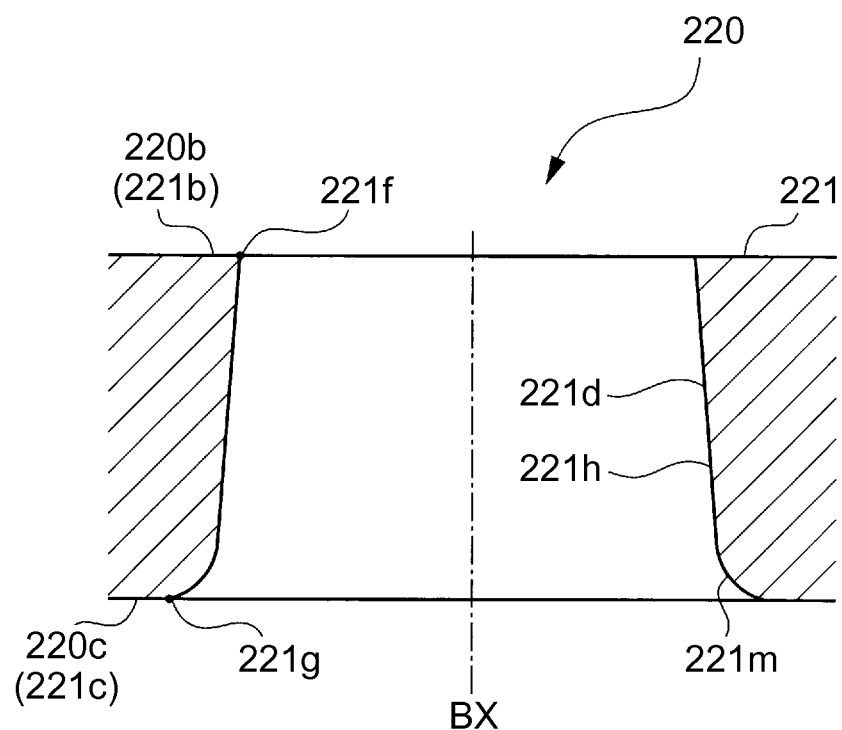
FIG. 17 is an enlarged sectional view of a holder according to another embodiment.

For example, in Embodiments 1, 2, the holder 20 configured such that C-chamfering is performed on the second open end portion 21m including the second open end 21g of the cell hold portion 21 (that end part of the inner peripheral surface 21h constituting the holding hole 21d which is on the second-surface-21c side) is used as a holder. However, a type of chamfering on the second open end portion is not limited to the C-chamfering, and may be any type of chamfering. For example, as illustrated in FIG. 17, a holder 220 configured such that R-chamfering is performed on a second open end portion 221m including a second open end 221g of a cell hold portion 221 (that end part of an inner peripheral surface 221h constituting a holding hole 221d which is on a second-surface-221c side) may be used.

What is claimed is:
1. An assembled battery comprising:
a holder including
a plurality of cell hold portions each having a first surface and a second surface facing an opposite side to the first surface and each having a holding hole, which is a hole penetrating through between the first surface and the second surface, wherein a direction from the first surface toward the second surface is defined as an upward direction, and
a connection portion that connects the plurality of cell hold portions to each other;
a plurality of cells each having an outside diameter smaller than an inside diameter of the holding hole and inserted into the holding hole of each of the plurality of cell hold portions; and
an adhesive provided so as to be solidified in a gap between an outer peripheral surface of a part of the cell, the part of the cell being placed inside the holding hole and an inner peripheral surface of the cell hold portion, the inner peripheral surface of the cell hold portion constituting the holding hole,
wherein each of the plurality of cells includes a negative terminal and a positive terminal, and a distance between the negative terminal and the second surface is less than a distance between the positive terminal and the second surface, and wherein the negative terminal protrudes no further than the second surface in the upward direction,
wherein:
the cell hold portion is configured such that an inside diameter of a first open end, which is an open end of the holding hole on a first-surface side, is smaller than an inside diameter of a second open end, which is an open end of the holding hole on a second-surface side; and
the inner peripheral surface constituting the holding hole includes a tapered surface having an inside diameter that is decreased toward the first-surface side from the second-surface side,
a chamfered part of the cell hold portion includes the second open end,
a position on the inner peripheral surface where the tapered surface is disposed is different from a position where the chamfered part of the cell hold portion is disposed.

2. The assembled battery according to claim 1, wherein the cells are fixed to the holder in a state where the cells are held by the cell hold portions via the adhesive.

3. The assembled battery according to claim 1, further comprising a resin sheet provided so as to make contact with the first surfaces of the plurality of cell hold portions, the resin sheet having through holes penetrating through the resin sheet, wherein:

the through holes of the resin sheet each have an inside diameter smaller than the inside diameter of the holding hole of the cell hold portion and smaller than the outside diameter of the cell; and an annular hole surrounding portion of the resin sheet which is a part constituting the through hole and is placed around the through hole is accommodated in the holding hole in a state where the annular hole surrounding portion makes contact with the outer peripheral surface of the cell inserted in the holding hole.

4. A manufacturing method of an assembled battery, the assembled battery including:

a holder including a plurality of cell hold portions each having a first surface and a second surface facing an opposite side to the first surface and each having a holding hole, which is a hole penetrating through between the first surface and the second surface, wherein a direction from the first surface toward the second surface is defined as an upward direction, and a connection portion that connects the plurality of cell hold portions to each other; and a plurality of cells each having an outside diameter smaller than an inside diameter of the holding hole and inserted into the holding hole of each of the plurality of cell hold portions, wherein each of the plurality of cells includes a negative terminal and a positive terminal, the manufacturing method comprising:

a cell insertion step of inserting the cells into the holding holes of the cell hold portions in the upward direction, so that a distance between the negative terminal and the second surface is less than a distance between the positive terminal and the second surface, and wherein the negative terminal protrudes no further than the second surface in the upward direction; and an adhesive injection step of injecting an adhesive into a gap between an outer peripheral surface of a part of the cell, the part of the cell being placed inside the holding hole and an inner peripheral surface of the cell hold portion, the inner peripheral surface of the cell hold portion constituting the holding hole, wherein:

the cell hold portion is configured such that an inside diameter of a first open end, which is an open end of the holding hole on a first-surface side, is smaller than an inside diameter of a second open end, which is an open end of the holding hole on a second-surface side; and the inner peripheral surface constituting the holding hole includes a tapered surface having an inside diameter that is decreased toward the first-surface side from the second-surface side, and a chamfered part of the cell hold portion includes the second open end, a position on the inner peripheral surface where the tapered surface is disposed is different from a position where the chamfered part of the cell hold portion is disposed.

5. The manufacturing method of the assembled battery, according to claim 4, wherein a viscosity of the adhesive to be injected in the adhesive injection step is within a range of 1 to 500 mPa s.

6. The manufacturing method of the assembled battery, according to claim 4, further comprising:

a resin sheet setup step of placing, before the cell insertion step, a resin sheet having through holes each having an inside diameter smaller than an inside diameter of the holding hole of the cell hold portion and smaller than an outside diameter of the cell, the resin sheet being placed so as to make contact with the first surfaces of the plurality of cell hold portions, wherein:

in the resin sheet setup step, the resin sheet is placed so that an annular hole surrounding portion of the resin sheet which is a part constituting the through hole and is placed around the through hole is put on the holding hole in an axis direction of the holding hole;

in the cell insertion step, the cells are inserted into the holding holes from a first-surface side of the cell hold portions; and in the adhesive injection step, the adhesive is injected into the gap from a second-surface side of the cell hold portion in a state where the second surface of the cell hold portion is directed upward.

7. The manufacturing method of the assembled battery, according to claim 4, wherein in the adhesive injection step, the adhesive is injected into the gap from the second-surface side of the cell hold portion in a state where the second surface of the cell hold portion is directed upward.

8. An assembled battery comprising:

a holder including a plurality of cell hold portions each having a first surface and a second surface facing an opposite side to the first surface and each having a holding hole, which is a hole penetrating through between the first surface and the second surface, wherein a direction from the first surface toward the second surface is defined as an upward direction, and a connection portion that connects the plurality of cell hold portions to each other;

a plurality of cells each having an outside diameter smaller than an inside diameter of the holding hole and inserted into the holding hole of each of the plurality of cell hold portions; and an adhesive provided so as to be solidified in a gap between an outer peripheral surface of a part of the cell, the part of the cell being placed inside the holding hole and an inner peripheral surface of the cell hold portion, the inner peripheral surface of the cell hold portion constituting the holding hole, wherein each of the plurality of cells includes a negative terminal and a positive terminal, and a distance between the negative terminal and the second surface is less than a distance between the positive terminal and the second surface, and wherein the negative terminal protrudes no further than the second surface in the upward direction, and the outside diameter of the cell is smaller than the inside diameter of the holding hole throughout the holding hole.

9. A manufacturing method of an assembled battery, the assembled battery including:

a holder including a plurality of cell hold portions each having a first surface and a second surface facing an opposite side to the first surface and each having a holding hole, which is a hole penetrating through between the first surface and the second surface, wherein a direction from the first surface toward the second surface is defined as an upward direction, and a connection portion that connects the plurality of cell hold portions to each other; and a plurality of cells each having an outside diameter smaller than an inside diameter of the holding hole and inserted into the holding hole of each of the plurality of cell hold portions, wherein each of the plurality of cells includes a negative terminal and a positive terminal, the manufacturing method comprising:

a cell insertion step of inserting the cells into the holding holes of the cell hold portions in the upward direction, so that a distance between the negative terminal and the second surface is less than a distance between the positive terminal and the second surface, and wherein the negative terminal protrudes no further than the second surface in the upward direction; and an adhesive injection step of injecting an adhesive into a gap between an outer peripheral surface of a part of the cell, the part of the cell being placed inside the holding hole and an inner peripheral surface of the cell hold portion, the inner peripheral surface of the cell hold portion constituting the holding hole, and the outside diameter of the cell is smaller than the inside diameter of the holding hole throughout the holding hole.

* * * * *